United States Patent

Hegg et al.

Patent Number: 5,440,428
Date of Patent: Aug. 8, 1995

[54] AUTOMOTIVE INSTRUMENT 3-D VIRTUAL IMAGE DISPLAY

[75] Inventors: Ronald G. Hegg, Carlsbad; Mao-Jin Chern, Rancho Palos Verdes, both of Calif.

[73] Assignee: Hughes Aircraft Company, Los Angeles, Calif.

[21] Appl. No.: 130,066

[22] Filed: Sep. 30, 1993

[51] Int. Cl.$^6$ ............................................. G02B 27/10
[52] U.S. Cl. .................................. 359/630; 345/7; 359/13; 359/633
[58] Field of Search ............ 359/13, 15, 22, 24, 359/32, 629–631, 633, 634; 345/7–9

[56] References Cited

U.S. PATENT DOCUMENTS

| | | | |
|---|---|---|---|
| 4,740,780 | 4/1988 | Brown et al. | 345/7 |
| 4,790,613 | 12/1988 | Moss | 359/15 X |
| 4,795,223 | 1/1989 | Moss | 345/7 |
| 4,961,625 | 10/1990 | Wood et al. | 359/630 |
| 4,988,976 | 1/1991 | Lu | 359/630 X |
| 5,013,135 | 5/1991 | Yamamura | 359/630 |

*Primary Examiner*—John D. Lee
*Attorney, Agent, or Firm*—Leonard A. Alkov; W. K. Denson-Low

[57] ABSTRACT

A compact, inexpensive and mass-producible optical display system for an automobile creates a dramatic and highly stylistic, sharp, high contrast and pleasing, multicolor or monochromatic 3-D magnified image of an instrument cluster, at least a portion of the 3-D image being located at a viewing distance greater than the actual optical distance between the dashboard and the driver's eyes. A non-pupil forming display system uses an off-axis aspherical narrow-band reflecting mirror with power to create a magnified virtual image of a miniaturized passive image source, such as a segmented LCD panel, which is backlighted by a small filament incandescent light bulb. A single mirror produces a single monochromatic virtual image, whereas a plurality of stacked and differently curved mirrors, each tuned to different wavelength bandwidth, produces a plurality of spatially separated virtual images of differing colors. The mirrors are holographic optical elements or graded index optical elements. A backlit panel display positioned behind the mirror produces an image with colors outside the bandwidth of that mirror and thereby creates a secondary image of oversized warning indicators or the like visible in front of the virtual image which includes a display of other instruments. A non-planar image source used with the mirror produces a non-planar monochromatic virtual image.

100 Claims, 6 Drawing Sheets

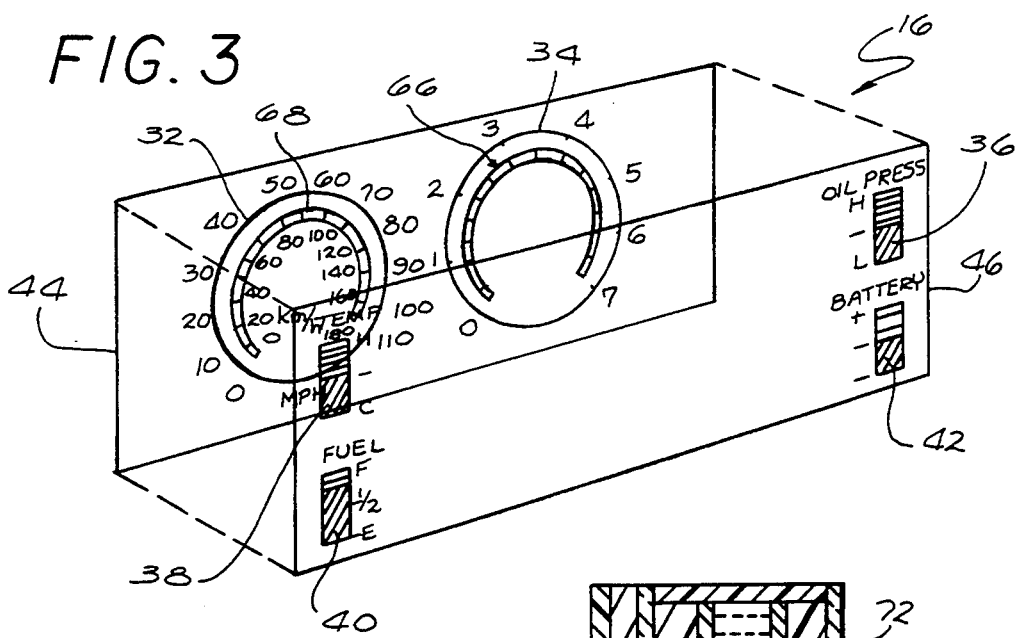
FIG. 3
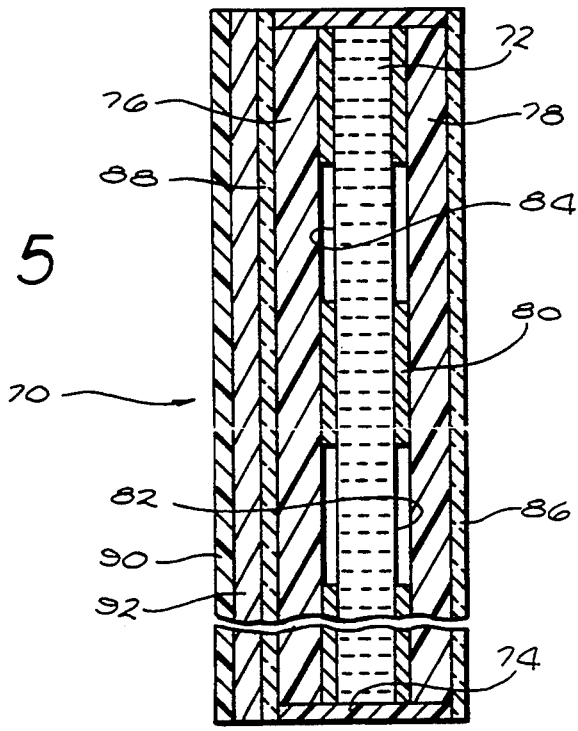
FIG. 5
FIG. 6
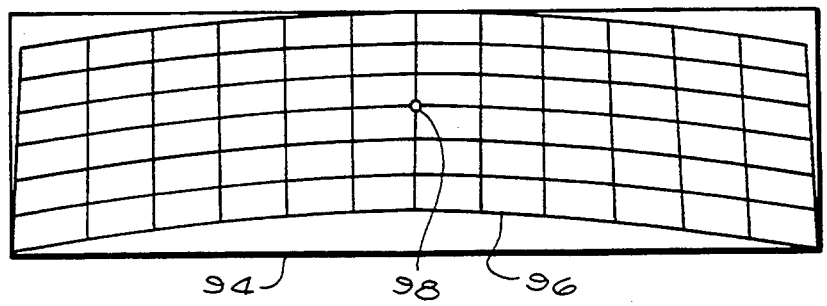

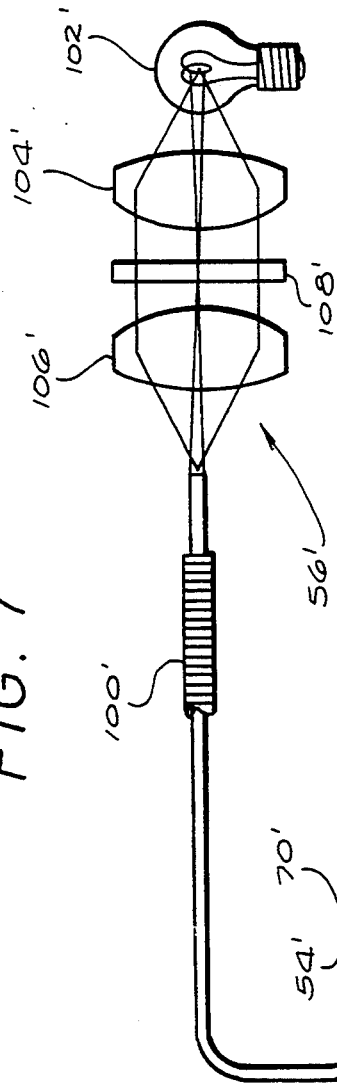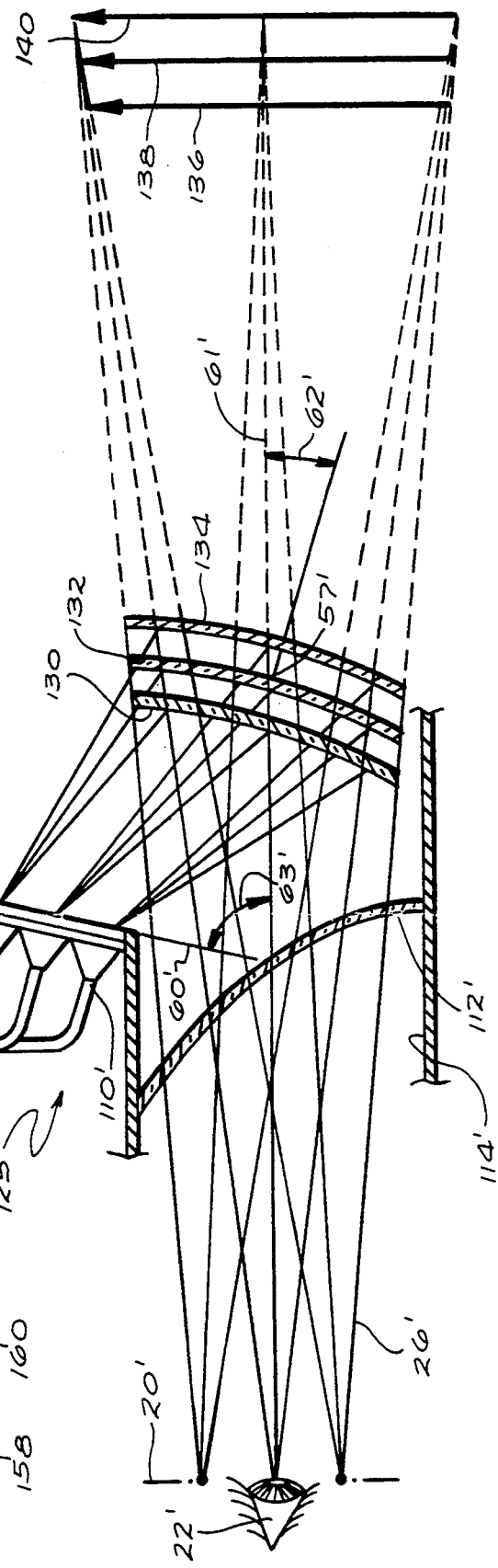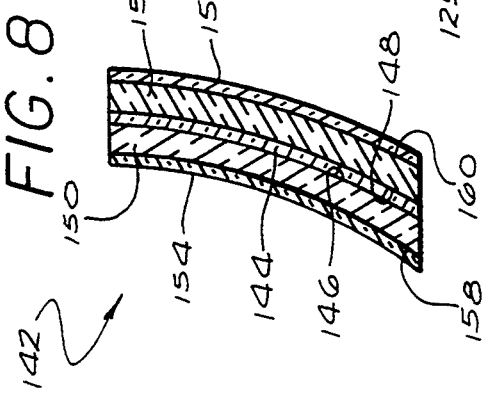

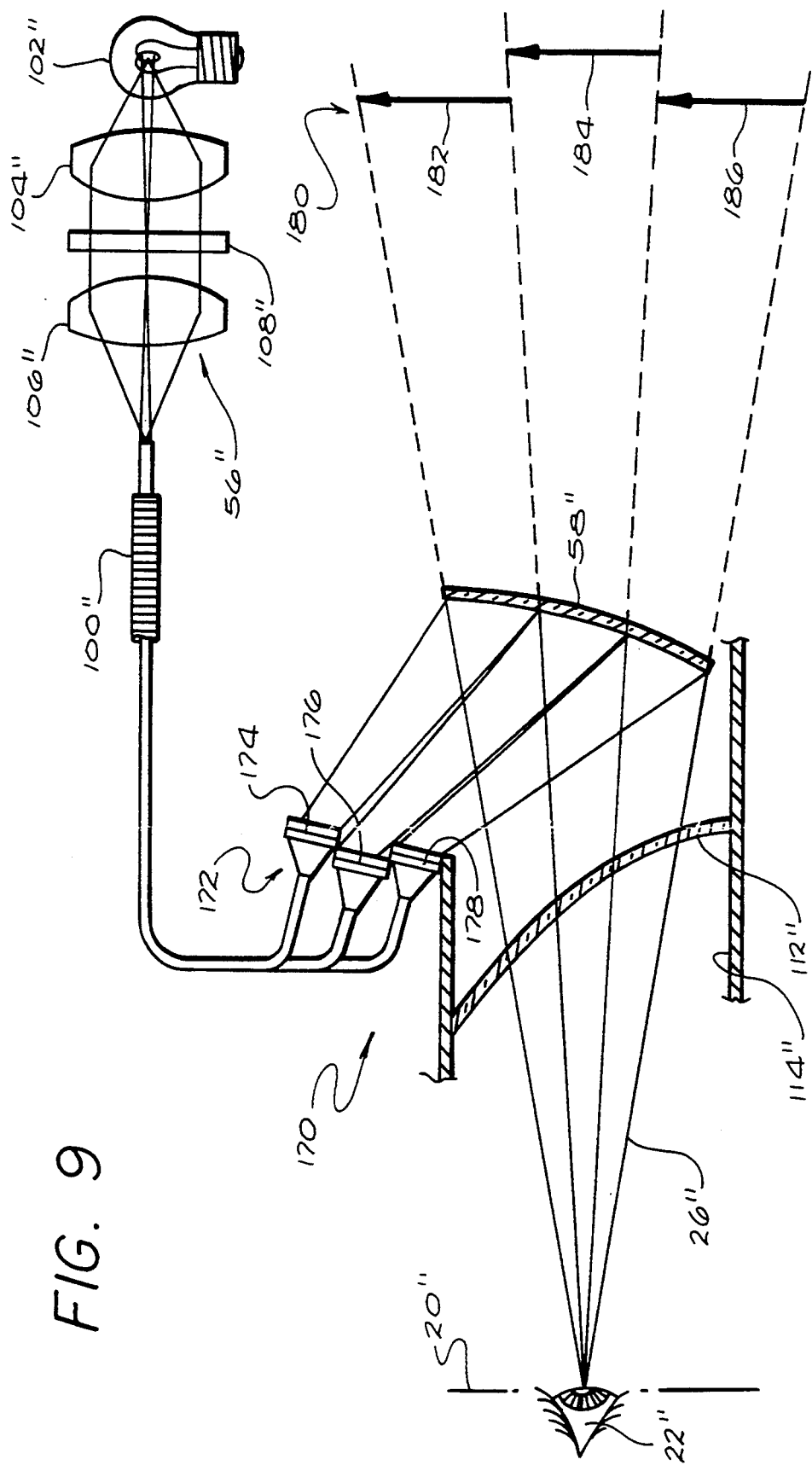

AUTOMOTIVE INSTRUMENT 3-D VIRTUAL IMAGE DISPLAY

BACKGROUND OF THE INVENTION

This invention relates generally to optical display systems and, more particularly, has reference to a new and improved system for displaying indicia in an automobile.

General production line automobiles typically have a plurality of instruments, indicators and gauges displayed on a dashboard panel behind the steering wheel. These instruments usually include a speedometer, a tachometer, a clock, an odometer, and a trip odometer, various auxiliary gauges for oil pressure, engine temperature, fuel level and battery charge, and a collection of system warning lights. In older cars, the instruments are often electro-mechanical devices with moving needle indicators. Newer models frequently use backlit direct view liquid crystal displays or self-illuminating vacuum fluorescent displays. The instruments are typically arranged in a planar cluster and thus appear to be equidistant from the driver's eyes.

Due to the limited space available in the interior of an automobile, the instrument panel is usually located relatively close (e.g., about two feet) to the driver's eyes. To read direct view instruments, the driver refocuses his eyes from the far range viewing (essentially at infinity) used to observe the road ahead to the near range viewing used to look at the instruments. While such systems generally have served their purposes, there remains a continuing desire for further improvements, particularly in the areas of instrument readability and reduced driver eye strain.

One foreign automobile manufacturer attempted to provide an improved instrument display having a viewing distance slightly beyond the normal dashboard panel position by mounting a transreflective flat folding mirror on the dashboard below a full-size vacuum fluorescent instrument display. Warning lamps were positioned behind the mirror in an attempt to create the effect of a 3-D image. This approach was unsatisfactory in several respects and left considerable room for improvement.

A need exists for an automobile instrument display system which minimizes driver eye strain and enhances instrument readability, particularly for older persons and persons who are far sighted or wear bifocals, by producing an instrument cluster image which is located well beyond (e.g., about one foot or more) the face of the dashboard and a considerable distance (e.g., about four feet or more) from the driver's normal viewing position and by producing an instrument cluster image which creates a dramatic visual impact in the automotive display environment, especially for warning indicators. The desired system would be configured to fit within the existing space/volume currently occupied by the conventional dashboard instrument panel, would provide a display format and viewing angle conditions which were similar to conventional direct view and planar instrument clusters, would provide a display image having comfortable visibility and legibility under all ambient light conditions, would be mass-producible at a cost comparable to a conventional direct view instrument cluster, would be simple in structure, would have an electrical interface which was compatible with an automotive electrical system, and would provide good optical characteristics, especially as regards to readability, image quality, disparity and color. Numerous problems are encountered in attempting to satisfy those needs.

For example, optical complications are caused by geometric conditions which are encountered in the typical automobile environment. For instance, the driver's head and eyes normally to do not remain stationary but move throughout an elliptical viewing area known as the eye motion box or the eyellipse. Drivers also have different seated body lengths and prefer different seat height and position adjustments. An eyellipse of about 8"H×5"V×10"D centered at about 0.5" from the instrument panel will accommodate most of the driver population. The typical instrument panel viewing angel (i.e., the line-of-sight used to see the instrument panel from the eyellipse) is about 19° below horizontal and the angular subtense (i.e., the amount of scan used to see the entire instrument display) is about 24° H×6° V.

Additional complications are caused by the problem of vertical disparity or divergence. When an object field is viewed through an optical system, each eye typically sees a somewhat different view. Vertical disparity is the angular difference along the vertical axis of an object point as viewed by each eye. Vertical disparity has a bearing upon driver viewing comfort. A driver's tolerance limit to vertical disparity influences the complexity of the display optics. An instrument display system should reduce vertical disparity to a level which is commensurate with driver comfort while not unduly complicating the display optics.

Still further complications are caused by the high ambient light conditions which are present in most automobiles. Ambient light includes direct sunlight and specular reflections from surrounding objects which can shine into the driver's eyes and reduce display visibility. The instantaneous dynamic range of an eye adapted to a typical horizon sky luminance of about 3,000 foot-Lamberts (fL) is on the order of about 600:1. Hence, the black level for this eye is about 5fL and all stimuli at luminancelevels of 5fL or less look equally black. Hence, even if there were no transmission losses and no noise (i.e., ambient light falling on and being reflected from the display), the luminance desired for the bright symbols of an instrument display in order to provide the 2:1 contrast generally regarded as adequate for viewing line/graphic images would be about 10 fL. This brightness should be provided by the electrical power available in an. automobile.

A uniform high contrast and uniform bright image of the instrument is also desired, even in these high ambient light conditions. However, the two conventional ways to diffuse light across a viewing area, i.e., opaque lambertian diffusion and high gain backlit diffusion, may be unsatisfactory in certain situations. In the case of lambertian diffusion, the light is scattered equally in all directions. Where the optical system utilizes the diffused light only within a small angular cone directed into the eye motion box, radiation outside this cone tends to become stray light which causes high background levels and reduced contrast ratio. High gain backlit diffusing screens scatter the light into a narrower angular cone and thus improve the effective optical efficiency, but the resulting display uniformity over the viewing area can be unsatisfactory. There may be an undesirable drop-off in brightness at the edge of the eye motion box.

Additional complications arise from the desire to provide a display system which is harmonious with the general styling of the automobile interior and which has high customer acceptance and appeal. In this regard, the system should be packaged to fit within the existing dashboard space now occupied by a conventional direct view instrument display, should be mass-producible at a reasonable cost, should provide a multi-color image, and should provide an image source whose stability, drift, latency and persistence are such that the image is not difficult to interpret nor aesthetically objectionable. it would also be desirable to provide an instrument which had a distinctive or highly stylistic appearance.

The present invention overcomes these problems and satisfies the need for an improved instrument display system.

SUMMARY OF THE INVENTION

Briefly, and in general terms, the present invention provides a virtual image display system for an automobile which creates a 3-D image of an instrument cluster and which magnifies some or all of the image and places it at a viewing distance which is substantially greater than the actual optical path length between the driver and the display, thereby enhancing instrument readability and visual impact, minimizing driver eye strain, and reducing eye focus problems when transmitting between watching the road ahead and glancing at the instruments.

By producing 3-D images, i.e., images that are not co-planar, the system can highlight certain cautionary images, such as warning indicators or turn signals, by making them stand out in a larger or more eye-grabbing manner or by superimposing them over other instrument such as the speedometer or tachometer. A 3-D image also tends to give a more "high-tech" or "aeronautic" look to the instrument cluster which can enhance its aesthetic appeal.

By increasing the image distance and optically placing some or all of it deeper into what appears to be a dark tunnel, and by providing effective shielding against strong ambient light, the system improves display visibility and provides a high contrast, sharp and pleasing instrument image display against typical ambient background levels. The system is sufficiently small, thin and compact to fit within the tight space which is available in the instrument panel region of a dashboard and is sufficiently simple in structure and design for mass-production at a reasonable cost. With superimposed images, the overall field-of-view of the instrument panel can be further reduced, thereby decreasing the package size and the optical complexity of the system.

In a presently preferred embodiment of the invention, by way of example and necessarily by way of limitation, the display system utilizes an optical imaging arrangement which includes an aspherical optical element, such as an off-axis narrow-band reflecting mirror with power, to create a magnified quasi-monochromatic virtual image of an instrument display at a distance of about four to twelve feet from the driver's nominal eye position and in the general direction of the dashboard panel region. The display would typically include, for example, a speedometer and a tachometer. Optical power achieves the desired eye-to-image distance notwithstanding vehicle design constraints which may limit the location of the display image source and other optical components in the system and which may limit the length of the optical path within the system. The aspheric shape of the mirror is computer-optimized to minimize aberrations, reduce vertical disparity between the driver's eyes to acceptable levels, reduce field curvature, and enhance system compactness by shortening the optical path length between the mirror and the image source, all with a relatively non-complex optical design.

In a preferred embodiment of the invention, a backlit panel display, such as a vacuum fluorescent panel, a liquid crystal display ("LCD") or a colored translucent panel with backlighting, which reduces an image in colors outside the bandwidth of the reflecting mirror, is positioned behind the mirror and transmits image information through the narrow band reflective mirror to produce a differently colored image located in front of the virtual image at about the position of the dashboard panel. This differently colored image could include, for example, oversized red warning lights which are superimposed over he virtual image or normal-sized indicators which are arranged to compliment virtual image.

In an alternative embodiment of the invention, a plurality of aspherical narrow-reflecting mirrors of the type described above are stacked together to create a plurality of magnified virtual images well beyond the location of the dashboard panel. Each mirror has a different wavelength bandwidth and a different optical radius so that each produces a different colored image at a different spatial location, creating the illusion of a 3-D image remote from the driver's nominal eye position.

preferred narrow-band mirror is a graded index element which is formed by a reflecting vapor-deposition layer coated into the first surface of an injection-molded aspheric plastic substrate. Alternately, the narrow-band mirror is a holographic mirror which is formed by an optically-recorded aspheric reflection hologram embedded in a spherical glass substrate.

the overall length of the optical system is reduced and the optics simplified by using the mirror in a non-pupil of configuration. When a single aspheric mirror is used as the entire optical system, chromatic aberrations are substantially eliminated and a particularly sharp chromatic image is produced.

A display system embodying features of the present invention the takes advantage of the "apparent size" effect to provide a display field-of-view which is smaller than the existing angular subtense of a conventional direct view instrument display. This reduction in field-of-view reduces system size a thus facilitates installation into the limited space available Docket No. ALKOV-34089 in an automobile. The reduced system size also frees up dashboard panel space which can be used for mounting other instruments or controls.

The preferred embodiment of the invention utilizes a passive image source which is pre-distorted to compensate for distortion in the off-axis optical system and which produces a rectilinear virtual image of the object scene. A segmented LCD is the preferred passive image source because it has a relatively thin panel, high resolution, high reliability and low power consumption. Appropriate color filters in the LCD panel assembly produce the quasi-monochromatic image light used with the single narrow-band mirror or the multi-color image light used with the plural stacked mirrors.

By using optical power in the system, the desired image size can be obtained with a miniaturized image source. Cost is particularly low with a miniaturized LCD source because the surface area is reduced.

The image source is typically planar. However, an alternative embodiment of the invention uses a non-planar image source and reflective mirrors to create a 3-D image. Since the image distance is determined by the distance between the mirror and the image source, the reflecting mirror produces a virtual image which tracks the configuration of the image source. Hence, a nonplanar image source will produce a substantially corresponding non-planar virtual image.

The LCD panel is backlighted to avoid the shadow effect. Illumination is provided by a relatively inexpensive and durable, small filament incandescent lamp which is positioned at a remote location. A fiber optic bundle pipes the light to the LCD panel. This remote illumination scheme facilitates replacement of the bulb in case of failure and reduces heat build-up in the region occupied by the image source. The fiber optic bundle splits into a number of spaced-apart ends behind the LCD panel assembly. The ends separately illuminate the panel assembly to promote a particularly high degree of illumination uniformity across the LCD within a closer illumination distance.

A directional diffusing screen element is disposed between the illumination optics and the image source to diffuse the illumination light and provide uniform high brightness and uniform contrast over the entire field-of-view. In the preferred embodiment of the invention, the light from each of the ends of the fiber optic bundle is directed towards the LCD panel assembly where it is diffused by a transmission diffusion hologram laminated into the rear of the assembly. The high efficiency and angular restrictive properties of the hologram cause the diffuse light from the LCD panel to be directed into the entrance aperture of the narrow-band mirror in a uniform and efficient manner, thereby producing a particularly bright image display. Appropriate collimating and condensing optics are used to collect and focus the light from the lamp into the aperture of the fiber optic bundle to produce an image brightness which is sufficient for an effective display presentation at night or in the high ambient light conditions of daytime.

The diffusing screen also reduces the intensity of the light near the edge of the viewing area in a desired manner, minimizing the visual impact of any optical aberrations, such as vertical disparity, residual distortion, horizontal focus and image motion, which may be present in those regions. By tailoring the intensity distribution of the diffusing screen over the viewing area, a non-pupil forming system can achieve some of the desirable optical properties of a pupil forming system without the inherent limitations of such a system.

In the preferred embodiment of the invention, a curved and tilted plastic glare shield is added after the reflecting mirror to protect the system optics and the LCD panel. The curvature and angle of the glare shield are selected so that ambient reflections from within the motion eye box are focused off the front surfaces of the glare shield and away from the image source onto a black surface, thereby maintaining the high contrast of the virtual image display. High contrast is further promoted by use of a holographic narrow-band reflecting mirror which decreases the amount of background ambient light that reflects off the mirror and contributes to the general background brightness of the LCD.

Other features and advantages of the invention will become apparent from the following detailed description taken in conjunction with the accompanying drawings, which illustrate, by way of example, the features of the invention.

DESCRIPTION OF THE DRAWINGS

FIG. 3 is a perspective view of a typical instrument display produced by the system of FIG. 1;

FIG. 5 is an enlarged, sectional view of the colorized LCD image source and diffusion hologram used in the system of FIG. 1, and taken substantially along the line 5—5 in FIG. 2;

FIG. 6 is a graphical representation of the distortion curve used in making the image source of FIG. 1;

FIG. 7 is a schematic diagram of another embodiment of the invention in the form of a virtual image display system with plural stacked reflecting mirrors, and which shows ray traces in the vertical plane;

FIG. 8 is an enlarged, sectional view of the stacked reflecting mirrors used in the system of FIG. 7; and FIG. 9 is a schematic diagram of yet another embodiment of the invention in the form of a virtual image display system with a non-planar image source, and which shows ray traces in the vertical plane.

DETAILED DESCRIPTION OF THE PREFERRED EMBODIMENT

Figure 1:
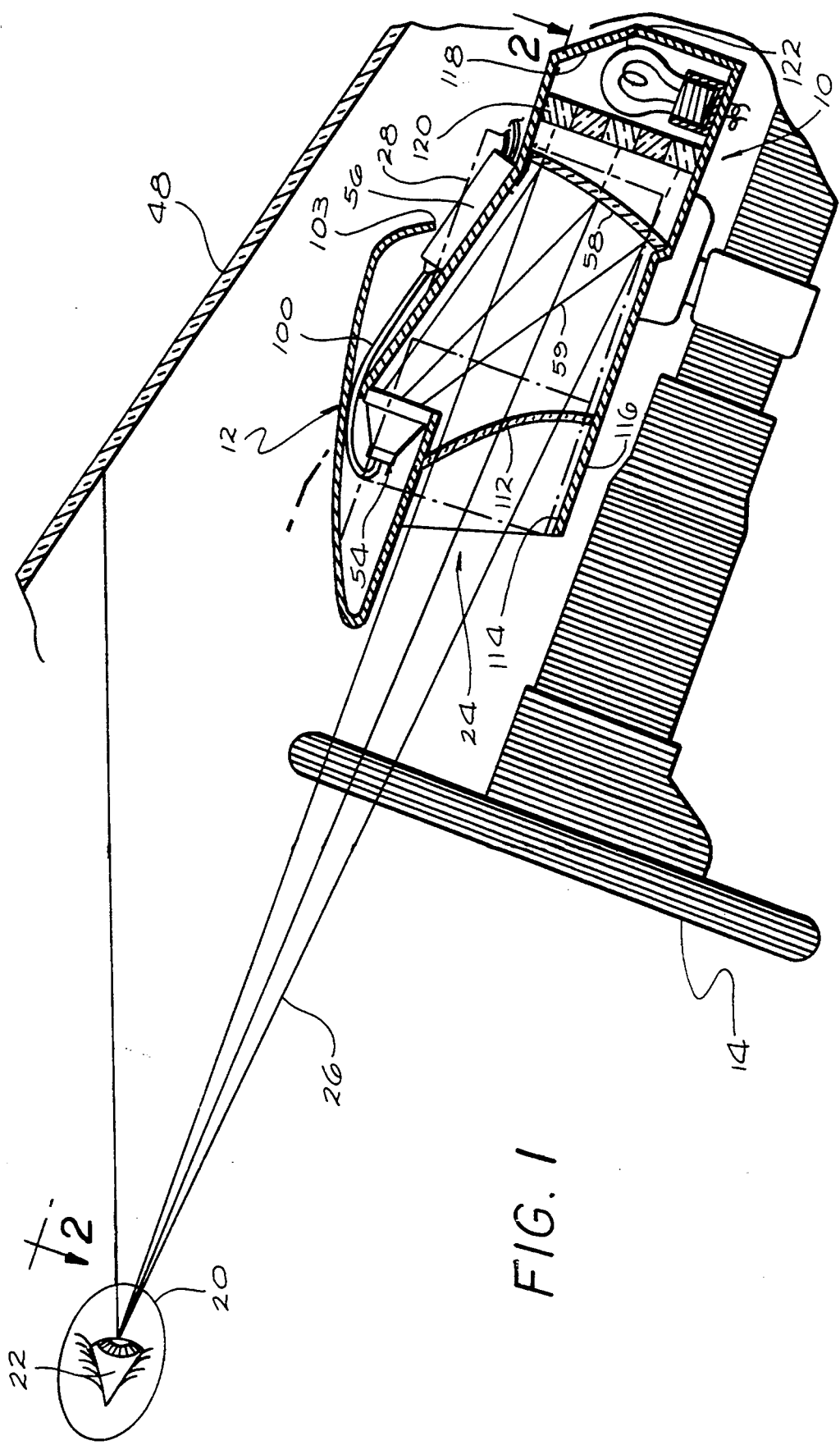
FIG. 1 is a vertical section representational view of a virtual image display system embodying features of the present invention and showing the system installed in the dashboard of an automobile.
Figure 2:
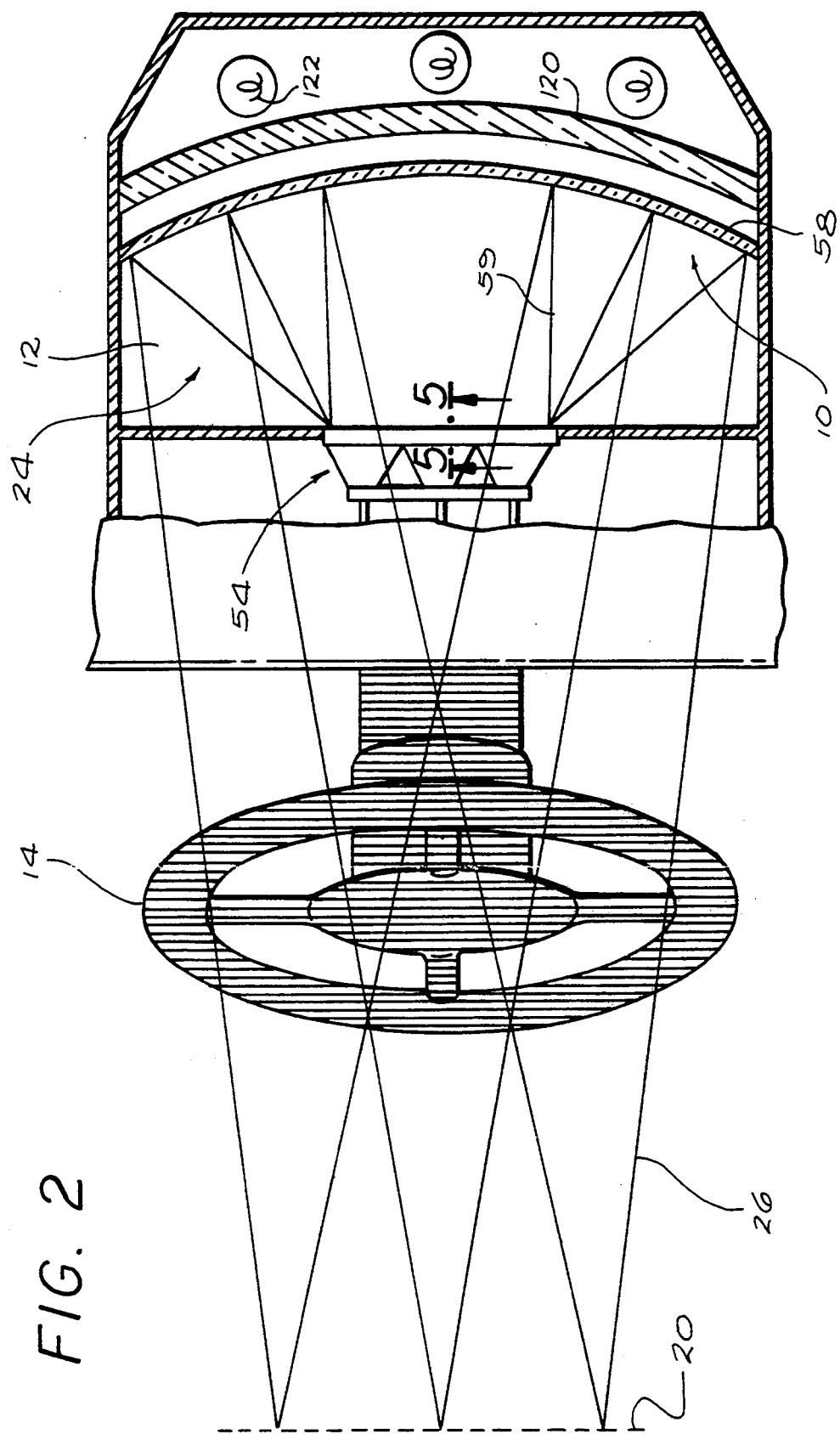
FIG. 2 is a sectional view of the system of FIG. 1, partly cut-away, and taken substantially along the line 2—2.

As shown in the drawings for purpose of illustration, and with particular reference to FIGS. 1-4, the present invention is embodied in an optical display system, generally indicated by the numerous 10, which is mounted in the dashboard 12 of an automobile behind the steering wheel 14 and which produces a 3-D image 16 (FIG. 3) of a primary instrument cluster, including warning indicators, that can be viewed from an eye motion box 20 at the driver's location when the driver 22 looks down and scans across the dashboard panel region 24 in the manner illustrated schematically by the light rays 26.

A conventional direct view instrument assembly 8, consisting of a plurality of electro-mechanical gauges or backlit direct view planar liquid crystal displays (not shown), is shown in phantom lines in FIG. 1 to illustrate by comparison and in a general manner the size, configuration and location of the dashboard panel region 24 of the automobile. It will be immediately appreciated that the system 10 embodying features of the present invention is sufficiently lightweight and compact (e.g., typically about 10"W×6"H×8"D and weighing about 2-3 Kg.) to be packaged into the tight space which is available in the dashboard panel region 24.

Referring again to FIG. 3, a typical 3-D instrument display image 16 produced by the display system 10 is similar in format to a conventional two-dimensional direct view instrument display and includes, for example a speedometer 32, a tachometer 34, an oil pressure warning indicator 36, an engine temperature warning indicator 38, a fuel level warning indicator 40, and a battery charge warning indicator 42, arranged in cluster fashion. However, the speedometer 32 and the tachometer 34 appear in a color (e.g., green) which is different from the color (e.g., red) of the warning indicators 36–42. Moreover, the speedometer 32 and tachometer 34 appear in a forward focal plane 46, thus creating a 3-D effect. To observe this instrument image while driving, the driver 22 momentarily redirects his eyes from the view of the road which he sees through the windshield 48 (FIG. 1) to the view of the instrument image 16 which he sees in the direction of the dashboard panel region 24.

The instrument image 16 illustrated in FIG. 3 shows the warning indicators 36–42 arranged off to the sides of the other instruments 32 and 34 in a manner which produces complementary images suitable for simultaneous display. With this type of arrangement, the non-planar effect and the differing coloration is used to create a distinctive and highly stylistic appearance which gives the instrument cluster a "high-tech" look. In an alternative arrangement (not shown), the warning indicators which appear in the forward focal plane are made oversized and placed directly in front of the instruments which appear in the rearward focal plane. The indicators are then selectively activated and deactivated as needed, with the activated indicators overriding the rest of the image display to provide greater visual emphasis. This type of superimposed image arrangement also tends to reduce the overall field-of-view of the instrument display, thereby permitting a decrease in the package size and the optical complexity of the display system 10.

In accordance with a preferred embodiment of the present invention, the optical display system 10 creates a virtual image 50 (FIG. 4) of the instruments displayed in the rearward focal plane 44 at a viewing distance which is substantially greater than the actual optical path length between the eyes of the driver 22 and the physical location of the system 10. This enhances instrument readability, minimizes driver eye strain, and reduces eye focus problems when the driver 22 transitions between watching the road ahead and glancing at these instruments 32 and 34. The improvement is particularly significant for older persons who may have diminished eye focusing capability and for persons who are far sighted or wear bifocals and must pull their head back or tilt their head up to get a clear view of close objects by optically placing these instruments 32 and 34 deeper into what appears to be a dark tunnel, and by providing effective shielding against strong ambient light, the system 10 improves display visibility and provides a high contrast, sharp and pleasing instrument presentation against typical ambient background levels. This arrangement is simple in structure and design and can be mass-produced at a reasonable cost.

Referring again to FIG. 4, the preferred display system 10 includes a miniaturized quasi-monochromatic image source 54 which produces an object scene display of the desired rearward focal plane instruments 32 and 34, an illumination system 56 which illuminates the image source 54, and an optical imaging element, such as an off-axis aspheric narrow-band reflecting mirror 58 with power, which deviates the quasi-monochromatic light 59 from the image source 54 into the driver's eye motion box 20 and focuses the light to produce a quasi-monochromatic magnified virtual image 50 of the instruments displayed by the source 54 at a considerable distance (e.g., about one foot or more) beyond the dashboard panel 24 and a considerable distance (e.g., about four feet or more) from the driver's normal viewing position within the eye motion box 20. Optical power achieves the desired eye-to-image distance notwithstanding vehicle design constraints which may limit the location of the image source 54 and the other optical components in the system 10 and which may limit the length of the optical path within the system 10.

According to the "apparent size" effect, when an object at a greater distance subtends the same visual angel as a familiar object at a closer distance, the mind attributes a greater size to the more distant object. Hence, instruments seen in the virtual image 50 produced by the display system 10 appear to be larger than instruments of the same size physically located at the dashboard panel 24 even though both may subtend the same angle at the driver's eyes. The present invention takes advantage of this effect to simplify the optical design. For example, a virtual image subtending about 3° at a viewing distance of about six feet would appear to be approximately the same size as a 6° direct view display located at a viewing distance of about two feet. Hence, the field-of-view of the virtual image display 10 can be reduced relative to the angular subtense of a conventional instrument assembly 28 without substantially degrading the perceived visibility and readability of the instrument display. With a reduced field of view, the display 10 embodying features of the present invention can be more easily packaged into the limited space available in the dashboard 12 and can free up space in the dashboard 12 for other uses.

A virtual image display system 10 with a field-of-view of about 12° H × 3° V visible over an eye motion box 20 sufficient to accommodate most of the driver population (e.g., about 8"H × 4"V unvignetted) would provide a virtual image 50 of suitable size for automobile instruments. By using a single continuous mirror 58 to fold the instrument display in the vertical plane, the full field-of-view can be shown within the desired eye motion box 20 with no obstructions or secondary folds in the path. When the single reflecting surface 58 is used as in the entire optical imaging system, chromatic aberrations are substantially reduced or eliminated and the system 10 provides a particularly sharp color image.

The aspheric nature of the narrow-band reflecting mirror 58 allows greater degrees of freedom in the design of the optical system and thus facilitates the task of providing a system 10 which has the image quality and physical characteristics desired for an automobile instrument display. In the preferred embodiment of the invention, the shape of the aspheric reflecting surface is computer-optimized to minimize aberrations, to reduce vertical disparity and field curvature, and to enhance system compactness by minimizing the radius of curvature of the mirror 58 and shortening the optical path length between the mirror 58 and the image source 54, all with a relatively non-complex optical design.

The overall length of the optical system is further reduced and the optics further simplified by using the mirror 58 in non-pupil forming configuration. A non-pupil forming optical system uses a lens group, or in the case of the instrument display system 10, the aspheric reflecting mirror 58 to magnify the image source 54 and produce a virtual image 50 at some distance from the driver 22. The virtual image 50 can be viewed optimally within a cone subtended by the mirror 58, but as the driver's eye 22 moves out of the optimal viewing cone, part of the image 50 begins to vignette (i.e., disappear). The further the driver 22 moves out of the central cone, the less of the image 50 he can see until eventually all of the image becomes vignetted. With a pupil-forming system, the optimal viewing region would be more confined and the virtual image would be completely vignetted when the driver's eyes moved out of the exit pupil. However, this added performance would come at the expense of additional optical elements (in the form of relay optics) and path length. The advantage of the non-pupil forming system resides in its relative simplicity. The overall length of the system is generally shorter than that of the pupil forming system which requires extra length to accommodate the additional relay optics. Any advantages offered by a pupil forming system in terms of aberration correction and distortion control are not essential in a look-down display such as the system 10, because the imagery in such a display is not being overplayed with a view of the real world. Greater levels of distortion and lower accuracy thus can be tolerated for acceptable performance. The desired levels of vertical disparity are well within the reach of a non-pupil forming system.

To view the entire virtual image 50 from anywhere within the eye motion box 20, the size of the mirror 58 in a non-pupil forming system 10 is selected in accordance with the following equation:

$$H = 2L \tan(FOV/2) + (Y-5)(1-L/R)$$

where
H is the size of mirror 58;
L is the distance from the driver 22 to the mirror;
FOV is the display field-of-view;
Y is the eye box 20 (in inches) desired for unvignetted viewing; and
R is the image distance range (i.e., eye 22 to virtual image 50).

Where packaging size is a constraint, as is the case with a system intended for use in the interior of an automobile, it is advantageous to place the optical system as close to the viewer as possible to minimize the size of the optics. For example, with an eye-to-panel distance of about 30", a typical mirror 58 for a 12° field-of-view display would have a reflecting region about 8.5"wide. For a 24° field-of-view, the reflecting region on the mirror 58 would be about 14.8 inches wide, which is about the same size as the conventional instrument assembly 28. In a preferred embodiment of the invention, the reflecting region of the aspheric mirror 58 is about 9.0"W×5.0"H.

Figure 4:
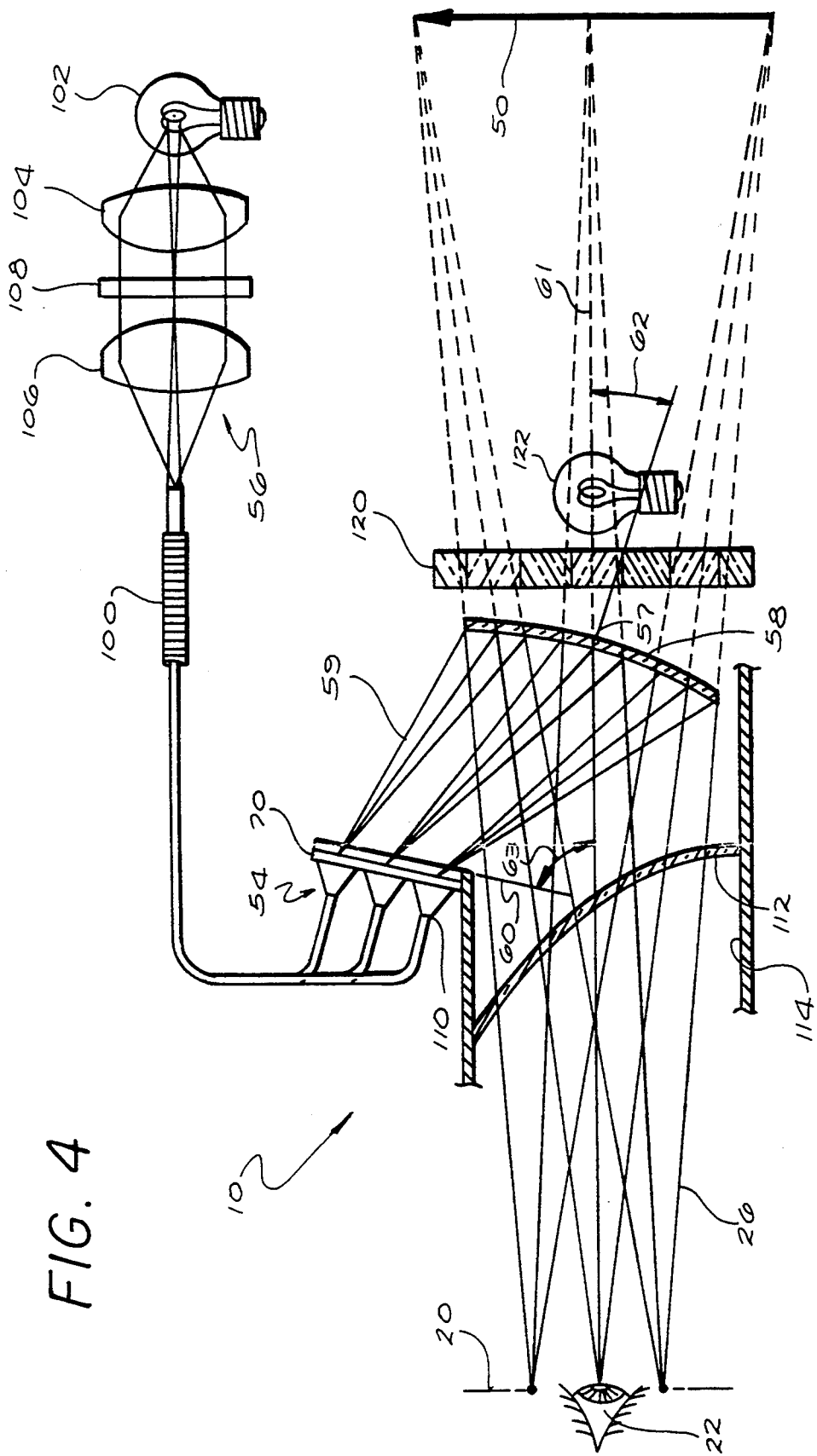
FIG. 4 is a schematic diagram of the display system of FIG. 1 which shows ray traces in the vertical plane.

In one embodiment of the invention, the center 57 of the aspheric mirror 58 is located about 30" from the eye motion box 20 and about 5.6" from the face plane 60 of the image source 54 as measured along the line-of-sight axis (represented in FIG. 4 by the central light ray 61). The mirror 58 is oriented at an off-axis angle 62 of about 14.4° and the face plane 60 of the image source 54 is oriented at an angle 63 of about 78° with respect to the line-of-sight axis 61. The aspheric reflecting region of the mirror 58 has about a 14"base radius which satisfies the following aspheric surface equation:

$$Z(X,Y) = R + \sqrt{(R^2 - (X^2 + Y^2))} + C5 * (X^2 - Y^2) + C8 * Y * (X^2 + Y^2)$$

where:
$R = -14$
$C5 = -0.934197 \times 10^{-3}$
$C8 = -0.627995 \times 10^{-3}$ X and Y are sample points (in inches along the aspheric surface as defined by a pair of mutually othogonal axes which are tangential to the surface; and Z is the orientation (in inches) of the axis normal to the aspheric surface at the X,Y sample point.

Data for sample points along the aspheric surface are indicated in the following table, in which "Z" is the data for the spherical base curve and "Z" is the deviation of the aspheric surface from the base curve at the respective X,Y sample points:

| SAMPLE POINTS (in inches): | | | |
|---|---|---|---|
| X | Y | ΔZ | Z |
| +0.000 | −2.000 | +.008761 | −.134833 |
| +0.000 | −1.000 | +.001562 | −.034198 |
| +.0000 | +0.000 | +.000000 | +.000000 |
| +0.000 | +1.000 | +.000306 | −.035454 |
| +0.000 | +2.000 | −.001287 | −.144881 |
| +1.000 | +0.000 | −.000934 | −.036694 |
| +2.000 | +0.000 | −.003737 | −.147330 |
| +3.000 | +0.000 | −.008408 | −.333613 |
| +4.000 | +0.000 | −.014947 | −.598539 |
| +4.000 | −2.000 | +.013909 | −.719591 |
| +4.000 | +2.000 | −.036330 | −.769831 |

In a preferred embodiment of the invention, the aspheric mirror 58 is a narrow-band reflective optical element. The aspheric mirror 58 is formed by a vapor deposition process of the type described, for example, in U.S. Pat. No. 4,545,646, entitled "Process For Forming A Graded Index Optical Material and Structures Formed Thereby," issued to Mao-Jin Chern et al, the entire disclosure of which is incorporated herein by reference. The narrow-band coating on the aspheric substrate reflects strongly the monochromatic color images from the image source, yet transmits other color images generated from the panel 120 in FIG. 4. In an alternative embodiment of the invention, the aspheric mirror is a narrow-band diffraction optical element which is generated using known methods of optical holography. A holographic mirror provides a number of advantages including, for example, a relatively high level of optical efficiency in reflecting light from the image source 54 to the eye motion box 20. A suitable holographic mirror 58 would include an aspheric reflection hologram optically recorded in a layer of photosensitive gelatin which is embedded in a spherical glass substrate. Narrow-band holographic mirrors for display system and methods for making the same are described, for example, in U.S. Pat. No. 3,940,204, entitled "Optical Display Systems Utilizing Holographic Lenses" issued to Roger J. Withrington, the entire disclosure of which is incorporated herein by reference.

The preferred embodiment of the invention utilizes a passive image source 54 which displays the desired rearward focal plane instruments 32 and 34 at the desired brightness and contrast, which is packaged into the available area in the dashboard 12, which provides the desired resolution and color, and that has input power requirements that are compatible with the electrical system of an automobile, all at a relatively low cost. The packaging and cost features are enhanced, in part, by taking advantage of optical power in the display system 10. Optical power allows the image source 54 to be miniaturized, i.e., made smaller than the size of the desired instrument display to be seen in the virtual image 50.

Liquid crystal displays are used in numerous consumer and industrial applications and are particularly desirable for use in automotive displays. They have a relatively thin panel, a high resolution due to the stroke quality of the segments, a high reliability, a low cost, and a low power consumption. The thickness of an LCD panel is about 0.25″ for relatively large panels (e.g., 5″×6″). The low drive voltage, typically in the range of about 2–10 volts, is also a desirable feature. LCDs have an operating and storage temperature range of about −40° C to +85° C., but because switching speeds tend to slow down at low temperatures, it may be desirable to add heater circuitry (not shown) to an LCD image source so that the display can continue to operate properly in cold weather within seconds of starting the automobile.

Segmented LCD panels are particularly desirable for use in the image source 54 because they can be configured with bar graphics 66 (FIG. 3) which provide a conventional-looking instrument format. A segmented LCD modulates light from a stationary illumination source in order to create what appears to be a moving image (e.g., a sliding indicator moving along a bar graph).

Referring to FIG. 5, a typical segmented LCD panel 70 of the twisted neumatic variety which is useful in the image source 54 includes an active liquid crystal layer 72 retained in a seal 74 between a pair of substrates 76 and 78. A pattern of spaced electrodes 80 are disposed along opposed surfaces 82 and 84 of the layer which have been chemically or physically treated to align the liquid crystal molecules. The electrodes 80 are selectively actuated to produce image pixels in a manner well known in the art. This entire structure is sandwiched between a pair of polarizers 86 and 88.

The quasi-monochromatic image light used with the narrow-band mirror 58 is generated by appropriate color filters 90 which are laminated behind a diffusing screen 92 adhered to the rearward polarizer 88 or, in an alternative embodiment (not shown), are laminated between the polarizer 88 and the diffusing screen 92. Suitable color filters include dielectric filters and pigmented transparent filters. When used with the preferred holographic diffusion screen 92 discussed below, the color filters 90 are selected to pass the colors which are diffracted by the diffusing screen 92. A multi-color LCD image source for use with alternative embodiments of the invention discussed below includes color filters 90 which provide a collection of differently colored areas.

Other types of image sources useful in the display system 10 include vacuum fluorescent displays, PLZT displays, miniature electro-mechanical dials, and hybrid combinations of mechanical dials and electro-optics sources. Dot matrix displays (LCD-type or VF-type) are particularly useful image sources where a reconfigurable image is desired.

An alternative embodiment of the invention which provides reduced aberrations or a wider field-of-view in a curved image surface (not shown) and a field lens/-prism (not shown) positioned in front of the curved surface.

When the aspheric mirror 58 is used in an off-axis configuration, the shape of the image source 54 as seen in the virtual image 50 will be distorted. A geometry correction is introduced into the system to compensate for this distortion and to produce a virtual image 50 which, as seen by the driver 22, is geometrically correct. The distortion normally is compensated by the design of the image source 54.

Specifically, the graphic pattern design of the image source 54 is pre-distorted to incorporate the geometry correction. In the case of a segmented LCD image source, the correction is built into the design by purposely distorting the artwork and the segment pattern in accordance with a distortion curve which is shaped to counterbalance the distortion in the off-axis configuration. Since the segmented LCD layout is custom configured, the artwork used to make the display can be pre-distorted with little or no increase in production cost and with little or no degradation of image quality.

A distortion curve for the particular aspheric surface described above is illustrated in FIG. 6. The desired rectilinear virtual image 50 is presented by a rectangle 94 having dimensions of about 2.364″W×0.699″H. The face of the LCD image source 54 is represented by a curvilinear grid pattern 96 which is disposed within the rectangle 94 about he center point 98. By arranging the LCD segments 68 of the image source 54 in a pattern that is pre-distorted in accordance with the grid pattern 96, the distortion present in the off-axis configuration is compensated and the virtual image 50 produced by the source 54 will be substantially rectilinear.

For a passive (i.e., non light emitting) image source 54, such as the segmented LCD panel 70, illumination is provided by an external illumination system 56. IN order to minimize the amount of wattage consumed by the illumination system 56, the display should be made as transmissive as possible and yet maintain uniform high brightness and uniform contrast over the entire eye motion box 20.

A holographic diffuser diffracts rather than scatters the light. All of the diffused illumination can be directed uniformly into an entrance pupil of the optical system and the diffraction angle can be readily adjusted to fit the optical configuration, thus providing high uniformity and high gain. With the eyellipse and eye-to-panel viewing distance encountered in the typical automobile environment, a hologram diffusing screen disposed between the illumination system 56 and the image source 54 diffuses the illumination light and provides a substantial improvement in display brightness.

Accordingly referring again to FIG. 5, it is preferred that the diffusing screen element 92 adhered to the LCD panel 70 be a transmission hologram diffusing screen and, more particularly, be a directional diffusing screen generally of the type described in U.S. Pat. No. 4,372,639, entitled "Directional Diffusing Screen", issued to Kenneth C. Johnson, the entire disclosure of which is incorporated herein by reference. The hologram is recorded so that the exit aperture properties of the transmission hologram thus direct the diffused light from the LCD panel 70 into the mirror aperture in a uniform and efficient manner. By so concentrating and directing the diffuse light, the virtual image 50 is provided with uniform high brightness and uniform contrast over the entire field-of-view when viewed from within the desired eye motion box 20.

An alternative diffusing screen which is particularly useful in the display system 10 is the aspheric lenticular screen made by Protolyte. The lenticular screen has some of the desirable optical properties of a holographic diffusing screen but it is less sensitive to the wavelength and angle of incidence of the incoming light. Image source tilt can be substantially reduced or eliminated when the lenticular screen is used.

The directional properties of the holographic diffusing screen 92 have the advantage of minimizing the visual impact of any aberrations, such as vertical disparity, residual distortion, horizontal focus and image motion, which may be present near the edge of the viewing area. By concentrating the light into the entrance aperture of the mirror 58, the screen 92 reduces the intensity of the light at the edges of the viewing area in a desired manner and thus makes any aberrations there more tolerable to the driver 22. By tailoring the intensity distribution of the diffusing screen 92 over the viewing area, the non-pupil forming system can be made to achieve some of the desirable optical properties of a pupil forming system without the inherent limitations of such a system.

Because the diffusing screen 92 is not used as an imaging element, the quality of the hologram is less critical. The screen 92 can be fabricated with high yield and low cost for automotive display applications. A suitable technique for making the transmission hologram diffusing screen 92 includes a plurality of holograms which are recorded at different wavelengths and respectively located such that the screen 92 is made responsive to different colors in different areas.

The illumination system 56 illuminates the image source 54 in a manner which provides the desired brightness, color balance, and uniformity.

With a holographic diffusing screen 92 it is particularly desirable to use a small point light source such as a small filament incandescent lamp or a fiber optic bundle. In a preferred embodiment of the invention, a fiber optic bundle 100 is used to pipe illumination to the LCD panel 70 from a remotely located lamp 102. The remote location is selected so that the lamp 102 is conveniently accessible for service or replacement in the case of lamp failure. The remote location also reduces the heat build-up in the region occupied by the image source 54. In one embodiment, the lamp is mounted adjacent a rearward open end 103 of the dashboard 12.

The light from the lamp 102 is collected and focused into the aperture of the fiber optic bundle 100 by an appropriate collimating aspheric lens 104 and an appropriate condensing aspheric lens 106. A filter 108 between the lenses 104 and 106 filters out light in the infrared wavelengths to facilitate the use of plastic fiber optics which have relatively low heat tolerance. The wattage of the lamp 102 is selected to take account of light loss and reduced light intensity which may occur when the illumination passes through the fiber optic bundle 100 and the collimating and condensing optics 104 and 106.

A particularly inexpensive and durable lamp 102 which is useful in the illumination system 56 is an incandescent lamp. A number of varieties exist which are capable of producing the luminance output desired to properly illuminate the image source 54 and which are compatible with the voltage and power forms typically found in an automobile.

In the case of a remote lamp where a fiber optics bundle 100 is used to pipe the light to the LCD panel 70, it is desirable to use a lamp 102 with a small filament size in order to increase the collection efficiency into the optical fiber 100. An example of such an incandescent lamp is the lamp #1874. The nominal design voltage of that lamp is about 3.7 volts and the nominal power consumption is about 10 watts. The lamp has a high luminous output and is therefore particularly well suited for a fiber bundle configuration. By using an f/1 condensing optics system of the type shown in FIG. 4, the lamp should produce an image brightness which is sufficient for an effective display presentation at night or in the high ambient light conditions of daytime.

When the image source 54 includes the segmented LCD panel 70, the exit aperture of the fiber optic bundle 100 is arranged to provide a backlit lighting scheme. Backlighting substantially eliminates the shadow effect which can be caused by the gap distance between the active liquid crystal layer 72 and the diffusing element 92 adhered to the LCD panel 70.

Referring again to FIG. 4, the fiber optic bundle 100 extends from the incandescent lamp 102 and preferably terminates behind the LCD panel assembly 70 in a plurality of spaced-apart ends 110. The light from each of the ends 110 is directed through the panel 70 where it is diffused by the transmission hologram diffusing element 92 and filtered by the color filter 90. By splitting the fiber bundle 100 in this manner, a high degree of illumination uniformity is achieved across the panel 70 within a closer illumination distance. By splitting the fiber 100 into a plurality of endings 110, each about an inch apart, the desired uniformity can be achieved with the endings 100 only about 1" from the panel 70.

Unwanted reflections caused by ambient light conditions are substantially reduced or minimized by proper selection and orientation of optical surfaces in the display system 10.

The primary source of unwanted ambient light in the display system 10 is the diffuse reflection of the outside ambient (i.e., the sun and sky) off of the driver 22 and the interior of the automobile. Through proper design of the display system housing, direct illumination by outside ambient can be substantially blocked.

Referring again to FIG. 1, the preferred embodiment of the invention includes a display system 10 which is enclosed at the front by a curved, plastic sheet, glare shield 112 oriented at an angle of about 45° with respect to the line-of-sight axis. The shield 112 traps firs surface reflections off of the sides of the display housing and off the glare shield 112 itself. The shield 112 is mounted in the plane between the bottom of the image source 54 and the bottom of the mirror 58 to prevent foreign objects from falling into the optical system. The curvature and angel of the shield 112 re selected so that any ambient reflection from the eye box area 20 is directed away from the image source 54 and into a light trap (e.g., a black surface 114 on the top of a lower projecting portion 116 of the dashboard 12), to preserve the high contrast of the virtual image 16.

The surface quality of the glare shield 112 is made high so that residual striae or defects therein will have minimal impact on the optical performance of the system 10. A suitable glare shield 112 is an optically clear plate or a neutral density filter. The shield 112 is preferably made of a contrast enhancement filter material such as the Didymium glass filter developed for sue as a contrast enhancement faceplate for a color CRT display.

First surface reflections off of the image source 54 are substantially minimized or eliminated by tilting the face of the source 54 towards the interior of the display housing or by applying a broadband anti-reflection coating thereto. Light baffles (not shown) and light absorbing paint on the interior surfaces of the display housing also may be used to further reduce ambient reflections.

The use of a holographic reflecting mirror 58 can also improve the image contrast by reducing the amount of unwanted ambient light with contributes to the general background brightness of the image source 54. The angular and wavelength sensitive properties of a single narrow-band hologram will typically permit only about 10%–20% of the ambient illumination to reflect off the mirror 58 and enter the region around the image source 54. The remaining 80–90% of the ambient light would transmit through the mirror and be absorbed by black surfaces 118 in the interior of the display housing. The resulting improvement in contrast would promote a sharp and readable virtual image 50 even under conditions of high ambient light and would permit the use of a lower wattage lamp 102 in the illumination system 56.

In a preferred embodiment of the invention, the images for the warning indicators 36–42 or other instruments displayed in the forward focal plane 46 are produced by a secondary image source 120 positioned directly behind the reflecting mirror 58 in the driver's line-of-sight 61. This secondary image source 120 is illuminated by its own secondary light source 122 and produces an image in front of the virtual image 50 near the location of the dashboard panel 24. Both the secondary image source 120 and the secondary light source are shown schematically in FIGS. 1, 2 and 4.

The narrow-band reflecting mirror 58 will reflect the light produced by the monochromatic image source 54, but it will substantially transmit light of different colors which emanates from the secondary image source 120. For example, if the reflecting mirror 58 is tuned to a narrow-band green, then a secondary image source 120 with multi-color capability could transmit blue, yellow and/or red images through the reflecting mirror 58. The driver would see a display of the images produced by the secondary image source 120 simultaneously with the green virtual image 50 produced by the monochromatic image source 54, but he would see them in different focal planes, thus creating the perception of a 3-D display. The narrow-band character of the reflecting mirror 58 would help preserve the separation of the forward and rearward planes 44 and 46 of the 3-D image because it would substantially preclude the monochromatic image source 54 from illuminating the secondary image source 120.

In a preferred embodiment of the invention, the secondary image source 120 is a backlit panel display such as vacuum fluorescent panel or a liquid crystal display. The panel display can be monochromatic or multi-colored and can produce a variety of different instrument images, as desired and as described previously with reference to the discussion of the 3-D image 16 shown in FIG. 3. The secondary light source 122 can be a local lamp or it can be a remotely positioned illumination system similar to the one used for illuminating the monochromatic LCD panel 70.

Referring now to FIG. 7, in which components that correspond to substantially identical components shown in FIG. 4 are identified by identical but primed (') reference numbers, an alternative embodiment of the present invention resides in an optical display system 125 in which the single aspheric narrow-band reflecting mirror is split into a plurality of aspheric narrow-band reflecting mirrors 130, 132 and 134, each tuned to reflect a different wavelength bandwidth. For example, the mirror 130 nearest the image source 54' could be tuned to reflect red, the mirror 134 farthest from the image source could be tuned to reflect blue, and the mirror 132 in between could be tuned to reflect green. When these mirror 130, 132 and 134 are exposed to light from a multi-color embodiment of the image source 54', the various color bands in the image will be separately reflected by their corresponding mirror and transmitted through the other mirror. Each mirror 130, 132 and 134 will thus produce its own magnified virtual image 136, 138 and 140 in its own particular monochromatic color at a location which is well beyond the dashboard panel 24.

The curvatures of the various mirrors 130, 132 and 134 are made different from each other so that the differently colored virtual image planes 136, 138 and 140 will be spatially separated and give the illusion of a 3-D image located remote from the driver's eyes 22. In an exemplary embodiment, the near range mirror 130 has a base curve radius of about 14", the middle range mirror 134 has a base curve radius of about 18". In the case of the preferred holographic reflecting mirror, the curvature refers to the holographically recorded radius of the fringe pattern.

Referring now to FIG. 8, the preferred embodiment of the plural mirror display system 125 utilizes an arrangement in which the various reflecting mirrors 130, 132 and 134 are stacked together into an integral mirror assembly 142. A layer of photosensitive gelatin 144 used for recording the middle range mirror 132 is sandwiched between appropriately curved surfaces 146 and 148 of a pair of spherical glass or plastic substrates 150 and 152. The layers of gelatin 154 and 156 used for recording the near range and far range mirrors 130 and 134, respectfully, are applied to the opposed and appropriately curved surfaces 158 and 160 of those same substrates 150 and 152. In an alternative embodiment (not shown), the various reflecting mirrors 130, 132 and 134 are all recorded in a single layer of photosensitive gelatin by exposing that layer to plural holographic exposures. In another alternative embodiment, the various reflecting mirrors 130, 132 and 134 are made of photo-chemical vapor deposition coatings with graded index structure for narrow band reflection.

Yet another embodiment of the present invention provides a display system 170 which is capable of producing a substantially 3-D image at a distance well beyond the dashboard panel 24. Referring to FIG. 9, in which components that correspond to substantially identical components in FIG. 4 have identical but double primed (") reference numbers, the system 170 utilizes an image source 172 which includes a plurality of non-planar segments 174, 176 and 178, each of which is similar in structure and arrangement to the image source 54 uses in the display system 10 described with reference to FIG. 4. Each image source can be multi-color. The broad band reflecting mirror 58" produces a magnified virtual image 80 which tracks the spatial configuration of the segmented image source 172. As a result, the virtual image 180 has a substantially corresponding arrangement of spatially separated, non=planar image segments 182, 184 and 186.

From the foregoing it will be appreciated that the present invention provides an inexpensive and mass-producible display system with optical power which is compatible with the styling and limited space available in the interior of an automobile and which creates a dramatic and highly stylistic, high contrast, sharp and pleasing, multi-color or monochromatic 3-D image of an automotive instrument cluster, at least a portion of the image being located at a viewing distance substantially beyond the face of the dashboard in order to enhance instrument readability and minimize driver eye strain.

While several particular forms of the invention have been illustrated and described, it will be apparent that various modifications can be made without departing from the spirit and scope of the invention.

We claim:

1. A display system for a vehicle having a display panel mounted within view of an operator's position, said display system comprising a first image source mounted in said vehicle for providing a first image display, a narrow band optical element disposed between said first image source and said operator's position for creating a first color virtual image of said first image display at a first spatial location visible from said operator's position, and a second image source for providing a second image display outside the bandwidth of said narrow band optical element, said second image source being positioned relative to said narrow band optical element to produce a second color image at a second spatial location visible from said operator's position, wherein said narrow band optical element creates said first color virtual image at a location beyond said display panel, wherein said narrow band optical element comprises an aspheric optical element, and further wherein said aspheric optical element comprises an aspheric optical surface shaped to reduce aberrations in said first color virtual image.

2. Apparatus as set forth in claim 1, wherein said second image source is positioned behind said narrow band optical element and transmits said second color image through said narrow band optical element to produce said second color image at a location in front of said first color virtual image.

3. Apparatus as set forth in claim 2, wherein said second color image is located at about the position of said display panel.

4. Apparatus as set forth in claim 3, wherein said narrow band optical element creates said first color virtual image at a location beyond said display panel.

5. Apparatus as set forth in claim 1, wherein said first color virtual image is a magnified image of said first image display.

6. Apparatus as set forth in claim 1, wherein said narrow band optical element is provided with optical power.

7. Apparatus as set forth in claim 1, wherein said first color virtual image is observable by said operator at a viewing distance in the range of about four to twelve feet.

8. Apparatus as set forth in claim 1, wherein said first image source is pre-distorted to compensate for distortion inherent in said system.

9. Apparatus as set forth in claim 1, wherein said first image source comprises a backlit panel display.

10. Apparatus as set forth in claim 1, wherein said first image source comprises a liquid crystal display.

11. Apparatus as set forth in claim 1, wherein said first image source comprises a colored translucent panel with backlighting.

12. Apparatus as set forth in claim 1, further comprising an illumination source located remote from said first image source for illuminating said first image source, and a fiber optic bundle for communicating light from said illumination source to said first image source.

13. Apparatus as set forth in claim 12, wherein said first image source comprises a liquid crystal display and said fiber optic bundle terminates behind said liquid crystal display in a plurality of spaced-apart ends which separately illuminate said liquid crystal display.

14. Apparatus as set forth in claim 12, further comprising a directional diffusing element disposed between said illumination source and said first image source for diffusing light from said illumination source which illuminates said first image source.

15. Apparatus as set forth in claim 14, wherein said directional diffusing element comprises a holographic element.

16. Apparatus as set forth in claim 15, wherein said holographic element comprises a transmission hologram.

17. Apparatus as set forth in claim 1, further comprising a curved glare shield disposed between said narrow band optical element and said operator's position, said glare shield being titled at an angle with respect to the optical axis to direct ambient light reflections away from said first image source.

18. Apparatus as set forth in claim 1, wherein one of said first and second image sources provides an image of vehicle instruments and the other of said first and second image sources provides an image of warning indicators.

19. A display system for a vehicle having a display panel mounted within view of an operator's position, said display system comprising a non-planar image source mounted in said vehicle for providing a non-planar image display, a reflective mirror disposed between said non-planar image source and said operator's position for creating a non-planar image of said non-planar image source at a location visible from said operator's position.

20. Apparatus as set forth in claim 19, wherein said reflective mirror creates a magnified virtual image of said non-planar image source at a location beyond said display panel.

21. Apparatus as set forth in claim 19, wherein said non-planar image source comprises a plurality of segments arranged in non-planar fashion.

22. Apparatus as set forth in claim 19, wherein said non-planar image source is a multi-color image source.

23. A display system for a vehicle having a display panel mounted within view of an operator's position, said display system comprising a first image source mounted in said vehicle for providing a first image display, a narrow band optical element disposed between said first image source and said operator's position for creating a first color virtual image of said first image display at a first spatial location visible from said operator's position, and a second image source for providing a second image display outside the bandwidth of said narrow band optical element, said second image source being positioned relative to said narrow band optical element to produce a second color image at a second spatial location visible from said operator's position, wherein said narrow band optical element creates said first color virtual image at a location beyond said display panel, wherein said narrow band optical element comprises an aspheric optical element, and further wherein said aspheric optical element comprises an aspheric optical surface which is shaped to reduce vertical disparity between the eyes of said operator observing said first color virtual image.

24. Apparatus as set forth in claim 23, wherein said second image source is positioned behind said narrow band optical element and transmits said second color image through said narrow band optical element to produce said second color image at a location in front of said first color virtual image.

25. Apparatus as set forth in claim 24, wherein said second color image is located a about the position of said display panel.

26. Apparatus set forth in claim 25, wherein said narrow band optical element creates said first color virtual image at a location beyond said display panel.

27. Apparatus as set forth in claim 23, wherein said first color virtual image is a magnified image of said first image display.

28. Apparatus as set forth in claim 23, wherein said narrow band optical element is provided with optical power.

29. Apparatus as set forth in claim 23, wherein said first color virtual image is observable by said operator at a viewing distance in the range of about four to twelve feet.

30. Apparatus as set forth in claim 23, wherein said first image source is pre-distorted o compensate for distortion inherent in said system.

31. Apparatus as set forth in claim 23, wherein said first image source comprises a backlit panel display.

32. Apparatus as set forth in claim 23, wherein said first image source comprises a liquid crystal display.

33. Apparatus as set forth in claim 23, wherein said first image source comprises a colored translucent panel with backlighting.

34. Apparatus as set forth in claim 23, further comprising an illumination source located remote from said first image source for illuminating said first image source, and a fiber optic bundle for communicating light from said illumination source to said first image source.

35. Apparatus as set forth in claim 34, wherein said first image source comprises a liquid crystal display and said fiber optic bundle terminates behind said liquid crystal display in a plurality of spaced-apart ends which separately illuminate said liquid crystal display.

36. Apparatus as set forth in claim 34, further comprising a directional diffusing element disposed between said illumination source and said first image source for diffusing light from said illumination source which illuminates said first image source.

37. Apparatus as set forth in claim 36, wherein said directional diffusing element comprises a holographic element.

38. Apparatus as set forth in claim 37, wherein said holographic element comprises a transmission hologram.

39. Apparatus as set forth in claim 23, further comprising a curved glare shield disposed between said narrow band optical element and said operator's position, said glare shield being tilted at an angle with respect to the optical axis to direct ambient light reflections away from said first image source.

40. Apparatus as set forth in claim 23, wherein one of said first and second image sources provides an image of vehicle instruments and the other of said first and second image sources provides an image of warning indicators.

41. A display system for a vehicle having a display panel mounted within view of an operator's position, said display system comprising a first image source mounted in said vehicle for providing a first image display, a narrow band optical element disposed between said first image source and said operator's position for creating a first color virtual image of said first image display at a first spatial location visible from said operator's position, and a second image source for providing a second image display outside the bandwidth of said narrow band optical element, said second image source being positioned relative to said narrow band optical element to produce a second color image at a second spatial location visible from said operator's position, wherein said narrow band optical element creates said first color virtual image at a location beyond said display panel, wherein said narrow band optical element comprises an aspheric optical element, and further wherein said aspheric optical element comprises an aspheric optical surface which is shaped to reduce field curvature in said first color virtual image.

42. Apparatus as set forth in claim 41, wherein said second image source is positioned behind said narrow band optical element and transmits said second color image through said narrow band optical element to produce sad second color image at a location in front of said first color virtual image.

43. Apparatus as set forth in claim 42, wherein said second color image is located at about the position of said display panel.

44. Apparatus as set forth in claim 43, wherein said narrow band optical element creates said first color virtual image at a location beyond said display panel.

45. Apparatus as set forth in claim 41, wherein said first color virtual image is a magnified image of said first image display.

46. Apparatus as set forth in claim 41, wherein said narrow band optical element is provided with optical power.

47. Apparatus as set forth in claim 41, wherein said first color virtual image is observable by said operator at a viewing distance in the range of about four to twelve feet.

48. Apparatus as set forth in claim 41, wherein said first image source is pre-distorted to compensate for distortion inherent in said system.

49. Apparatus as set forth in claim 41, wherein said first image source comprises a backlit panel display.

50. Apparatus as set forth in claim 41, wherein said first image source comprises a liquid crystal display.

51. Apparatus as set forth in claim 41, wherein said first image source comprises a colored translucent panel with backlighting.

52. Apparatus as set forth in claim 41, further comprising an illumination source located remote from said first image source for illuminating said first image source, and a fiber optic bundle for communicating light from said illumination source to said first image source.

53. Apparatus as set forth in claim 52, wherein said first image source comprises a liquid crystal display and said fiber optic bundle terminates behind said liquid crystal display in a plurality of spaced-apart ends which separately illuminate said liquid crystal display.

54. Apparatus as set forth in claim 52, further comprising a directional diffusing element disposed between said illumination source and said first image source for ! diffusing light from said illumination source which illuminates said first image source.

55. Apparatus as set forth in claim 54, wherein said directional diffusing element comprises a holographic element.

56. Apparatus as set forth in claim 55, wherein said holographic element comprises a transmission hologram.

57. Apparatus as set forth in claim 41, further comprising a curved glare shield disposed between said narrow band optical element and said operator's position, said glare shield being tilted at an angle with respect to the optical axis to direct ambient light reflections away from said first image source.

58. Apparatus as set forth in claim 41, wherein one of said first and second image sources provides an image of vehicle instruments and the other of said first and second image sources provides an image of warning indicators.

59. A display system for a vehicle having a display panel mounted within view of an operator's position, said display system comprising a first image source mounted in said vehicle for providing a first image display, a narrow band optical element disposed between said first image source and said operator's position for creating a first color virtual image of said first image display at a first spatial location visible from said operator's position, and a second image source for providing a second image display outside the bandwidth of said narrow band optical element, said second image source being positioned relative to said narrow band optical element to produce a second color image at a second spatial location visible from said operator's position, wherein said narrow band optical element creates said first color virtual image at a location beyond said display panel, wherein said narrow band optical element comprises an aspheric optical element, and further wherein said aspheric optical element comprises an aspheric optical surface which is shaped to reduce optical path length between said first image source and said aspheric optical element.

60. Apparatus as set forth in claim 59, wherein said second image source is positioned behind said narrow band optical element and transmits said second color image through said narrow band optical element to produce said second color image at a location in front of said first color virtual image.

61. Apparatus as set forth in claim 60, wherein said second color image is located at about the position of said display panel.

62. Apparatus set forth in claim 61, wherein said narrow band optical element creates said first color virtual image at a location beyond said display panel.

63. Apparatus as set forth in claim 59, wherein said first color virtual image is a magnified image of said first image display.

64. Apparatus as set forth in claim 59, wherein said narrow band optical element is provided with optical power.

65. Apparatus as set forth in claim 59, wherein said first color virtual image is observable by said operator at a viewing distance in the range of about four to twelve feet.

66. Apparatus as set forth in claim 59, wherein said first image source is pre-distorted to compensate for distortion inherent in said system.

67. Apparatus as set forth in claim 59, wherein said first image source comprises a backlit panel display.

68. Apparatus as set forth in claim 59, wherein said first image source comprises a liquid crystal display.

69. Apparatus as set forth in claim 59, wherein said first image source comprises a colored translucent panel with backlighting.

70. Apparatus as set forth in claim 59, further comprising an illumination source located remote from said first image source for illuminating said first image source, and a fiber optic bundle for communicating light from said illumination source to said first image source.

71. Apparatus as set forth in claim 70, wherein said first image source comprises a liquid crystal display and said fiber optic bundle terminates behind said liquid crystal display in a plurality of spaced-apart ends which separately illuminate said liquid crystal display.

72. Apparatus as set forth in claim 70, further comprising a directional diffusing element disposed between said illumination source and said first image source for diffusing light from said illumination source which illuminates said first image source.

73. Apparatus as set forth in claim 72, wherein said directional diffusing element comprises a holographic element.

74. Apparatus as set forth in claim 73, wherein said holographic element comprises a transmission hologram.

75. Apparatus as set forth in claim 59, further comprising a curved glare shield disposed between said narrow band optical element and said operator's position, said glare shield being tilted at an angle with respect to the optical axis to direct ambient light reflections away from said first image source.

76. Apparatus as set forth in claim 59, wherein one of said first and second image sources provides an image of vehicle instruments and the other of said first and second image sources provides an image of warning indicators.

77. A display system for a vehicle having a display panel mounted within view of an operator's position, said display system comprising a first image source mounted in said vehicle for providing a first image display, a mirror disposed between said first image source and said operator's position for creating a first color virtual image of said first image display at a first spatial location visible from said operator's position, and a second image source for providing a second image display outside the bandwidth of said mirror, said second image source being positioned relative to said mirror to produce a second color image at a second spatial location visible from said operator's position.

78. Apparatus as set forth in claim 77, wherein said second image source is positioned behind said mirror and transmits said second color image through said mirror to produce said second color image at a location in front of said first color virtual image.

79. Apparatus as set forth in claim 79, wherein said second color image is located at about the position of said display panel.

80. Apparatus as set forth in claim 79, wherein said mirror creates said first color virtual image at a location beyond said display panel.

81. Apparatus as set forth in claim 77, wherein said mirror creates said first color virtual image at a location beyond said display panel.

82. Apparatus as set forth in claim 81, wherein said mirror is aspheric.

83. Apparatus as set forth in claim 82, wherein said aspheric mirror comprises an aspheric optical surface shaped to reduce aberrations in said first color virtual image.

84. Apparatus as set forth in claim 82, wherein said aspheric mirror comprises an aspheric optical surface which is shaped to reduce vertical disparity between the eyes of said operator observing said first color virtual image.

85. Apparatus as set forth in claim 82, wherein said aspheric mirror comprises an aspheric optical surface which is shaped to reduce field curvature in said first color virtual image.

86. Apparatus as set forth in claim 82, wherein said aspheric mirror comprises an aspheric optical surface which is shaped to reduce optical path length between said first image source and said aspheric mirror.

87. Apparatus as set forth in claim 77, wherein said first color virtual image is a magnified image of said first image display.

88. Apparatus as set forth in claim 88, wherein said mirror is provided with optical power.

89. Apparatus as set forth in claim 77 wherein said first color virtual image is observable by said operator at a viewing distance in the range of about four to twelve feet.

90. Apparatus as set forth in claim 77, wherein said first image source is pre-distorted to compensate for distortion inherent in said system.

91. Apparatus as set forth in claim 77, wherein said first image source comprises a backlit panel display.

92. Apparatus as set forth in claim 77, wherein said first image source comprises a liquid crystal display.

93. Apparatus as set forth in claim 77, wherein said first image source comprises a colored translucent panel with backlighting.

94. Apparatus as set forth in claim 77, further comprising an illumination source located remote from said first image source for illuminating said first image source, and a fiber optic bundle for communicating light from said illumination source to said first image source.

95. Apparatus as set forth in claim 94, wherein said first image source comprises a liquid crystal display and said fiber optic bundle terminates behind said liquid crystal display in a plurality of spaced-apart ends which separately illuminate said liquid crystal display.

96. Apparatus as set forth claim 94, further comprising a directional diffusing element disposed between said illumination source and said first image source for diffusing light from said illumination source which illuminates said first image source.

97. Apparatus as set forth in claim 96, wherein said directional diffusing element comprises a holographic element.

98. Apparatus as set forth in claim 97, wherein said holographic element comprises a transmission hologram.

99. Apparatus as set forth in claim 77, further comprising a curved glare shield disposed between said mirror and said operator's position, said glare shield being tilted at an angle with respect to the optical axis to direct ambient light reflections away from said first image source.

100. Apparatus as set forth in claim 77, wherein one of said first and second image sources provides an image of vehicle instruments and the other of said first and second image sources provides an image of warning indicators.

* * * * *